United States Patent
Cheung (10) Patent No.: US 7,801,069 B2
(45) Date of Patent: Sep. 21, 2010

(54) DISTRIBUTION OF PACKETS AMONG A PLURALITY OF NODES

(75) Inventor: Gene Cheung, Tokyo (JP)

(73) Assignee: Hewlett-Packard Development Company, L.P., Houston, TX (US)

(*) Notice: Subject to any disclaimer, the term of this patent is extended or adjusted under 35 U.S.C. 154(b) by 89 days.

(21) Appl. No.: 12/166,998

(22) Filed: Jul. 2, 2008

(65) Prior Publication Data

US 2010/0002695 A1    Jan. 7, 2010

(51) Int. Cl.
*H04H 20/71* (2008.01)
(52) U.S. Cl. ............................. 370/312; 370/390
(58) Field of Classification Search ............. None
See application file for complete search history.

(56) References Cited

U.S. PATENT DOCUMENTS

| | | | |
|---|---|---|---|
| 6,879,589 B2 * | 4/2005 | Sera | 370/394 |
| 6,993,041 B2 * | 1/2006 | Yamamoto | 370/413 |
| 2004/0039840 A1 * | 2/2004 | Dispensa et al. | 709/242 |
| 2008/0112404 A1 * | 5/2008 | Kuri et al. | 370/389 |
| 2008/0267078 A1 * | 10/2008 | Farinacci et al. | 370/244 |

OTHER PUBLICATIONS

Cheung, G. et al., "On the Complexity of Variants of Cooperative Peer-to-Peer Repair for Wireless Broadcasting", HPL-226-90, HP Laboratories Japan, Jun. 8, 2006.
Liu, X. et al., "Network Coding Based Cooperative Peer-to-Peer Repair in Wireless Ad-Hoc Networks", May 2008.
Raza, S. et al., "Cooperative Peer-to-Peer Repair for Wireless Multimedia Broadcast", IEEE, ICME 2007.

* cited by examiner

*Primary Examiner*—Steven H Nguyen
*Assistant Examiner*—Alex Skripnikov (57) ABSTRACT

In a method of distributing packets from a multimedia source to a plurality of nodes, in at least one of the plurality of nodes, a packet stream is received from the multimedia source and a received packet is outputted. In addition, in at least another one of the plurality of nodes, the packet stream is received from the multimedia source, a packet outputted by the at least one of the plurality of nodes is received, determination as to whether a packet is missing from the packet stream received from the multimedia source is made, a determination as to whether the packet outputted by the at least one other node comprises a missing packet is made, and the packet outputted by the at least one other node is stored in response to the outputted packet comprising a missing packet.

16 Claims, 6 Drawing Sheets

DISTRIBUTION OF PACKETS AMONG A PLURALITY OF NODES

BACKGROUND

Delivery of data packets from multimedia sources over wide area networks (WAN), such as cellular networks, is often plagued with a high packet loss rate caused by wireless link failures resulting from shadowing, fading and interferences. For point-to-point unicast delivery, sophisticated schemes using combinations of automatic retransmission request (ARQ) and forward error correction (FEC) schemes are deployed at the Application, Radio Link Control (RLC), MAC and Physical layers to combat packet losses. These schemes rely on a fast and reliable feedback channel from the receiver to the sender at the multimedia sources or base stations to report statuses of transmitted packets. Typically, the resulting throughput is lower or additional network resources are required to maintain the same throughput when the channel conditions a user experiences is poor.

Multimedia sources employing Multimedia Broadcast Multicast Service (MBMS), which is a broadcast/multicast service specified in the $3^{rd}$ Generation Partnership Project (3GPP), use a single transmission channel for broadcast or multicast to multiple users demanding the same content. Although the multicast mode of MBMS has an available feedback channel, the well known NAK implosion problem, in which the single sender is overwhelmed by the number of ARQ requests from a large number of receivers, means that many of the ARQ-based or hybrid ARQ/FEC transmission mechanisms developed for point-to-point unicast transmissions cannot be deployed for MBMS when the receiver group is large. As a result, the common transport strategy for MBMS is forward error correction (FEC)-based, where FEC codes like the Raptor Code is applied at the application layer to improve video streaming quality. FEC-based schemes for MBMS are usually optimized for the average user. As such, at any given time, unlucky users experiencing worse-than-average channel conditions will suffer significant packet losses. Mathematically, the typical MBMS media distribution optimization for the average user is of the form:

$$\min D_{avg}(R_s, R_c) \text{ s.t. } R_s + R_c \leq C \quad \text{Equation (1):}$$

In Equation (1), the sender attempts to minimize the distortion of the average user $D_{avg}$ using source bits $R_s$ to encode the media source and channel bits $R_c$ to protect the encoded source bits (using FEC, for example) subject to a channel bitrate constraint C. If, on the other hand, FEC-based schemes for MBMS are optimized for the worst user at any given time, then significantly more channel bits $R_c$ are needed to combat more frequent channel losses of the worst channel, meaning there are fewer bits leftover for source bits $R_s$ to encode the media source, which often leads to a poor visual quality for everyone in the multicast group.

An improved approach to reducing or eliminating packet losses incurred during a multicast or a broadcast to a group of receivers without substantially increasing throughput requirements would therefore be beneficial.

BRIEF DESCRIPTION OF THE DRAWINGS

Features of the present invention will become apparent to those skilled in the art from the following description with reference to the figures, in which.

DETAILED DESCRIPTION

For simplicity and illustrative purposes, the present invention is described by referring mainly to an exemplary embodiment thereof. In the following description, numerous specific details are set forth in order to provide a thorough understanding of the present invention. It will be apparent however, to one of ordinary skill in the art, that the present invention may be practiced without limitation to these specific details. In other instances, well known methods and structures have not been described in detail so as not to unnecessarily obscure the present invention.

Disclosed herein are methods and systems for distributing packets from a multimedia source to a plurality of nodes. More particularly, the methods and systems disclosed herein enable cooperative peer-to-peer repair among the nodes such that each of the nodes has a higher likelihood of receiving all of the packets broadcasted from the multimedia source during a fixed MBMS transmission period. In addition, the likelihood of receiving all of the packets is increased without relying upon the multimedia source to retransmit the packets because missing packets may be obtained from peer nodes. As such, when the nodes are missing packets, the multimedia source is not required to handle overwhelming retransmission requests from the nodes. Instead, the nodes may seek assistance from neighboring nodes to recover the missing packets.

Through implementation of the methods and systems disclosed herein, the effective multicast media distribution quality from a single source to a group of multi-homed devices may greatly be increased. The increase may be realized without any change to an existing cellular network infrastructure over which the media is delivered to the multi-homed devices.

Figure 1A:
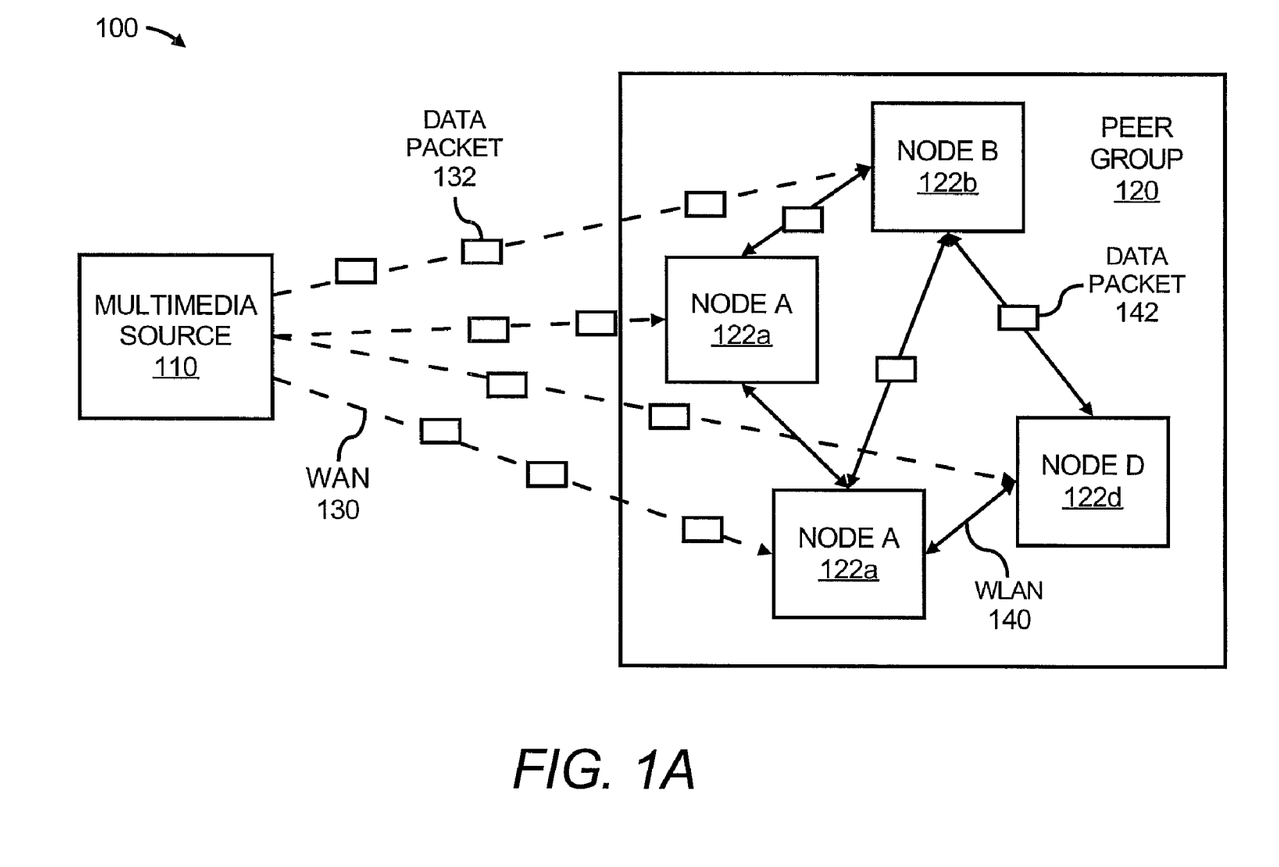
FIG. 1A depicts a simplified block diagram of a system for distributing packets to a plurality of nodes, according to an embodiment of the invention.

With reference first to FIG. 1A, there is shown a simplified block diagram of a system 100 for distributing packets to a plurality of nodes, according to an example. In one regard, the various methods and systems disclosed herein may be implemented in the system 100 depicted in FIG. 1A as discussed in greater detail herein below. It should be understood that the system 100 may include additional components and that some of the components described herein may be removed and/or modified without departing from a scope of the system 100.

As shown in FIG. 1A, the system 100 includes a multimedia source 110 and a plurality of nodes 122a-122n. The multimedia source 110 generally comprises a content provider, such as, a web-based content provider configured to supply multimedia content via data packets 132 to the plurality of nodes 122a-122n, where "n" is an integer greater than one. By way of example, the multimedia source 110 is configured to provide a Multimedia Broadcast Multimedia Service (MBMS) to the nodes 122a-122n as specified in the 3$^{rd}$ Generation Partnership Project (3GPP). In version 6 and later of the 3GPP, the MBMS uses a single transmission channel for broadcast or multicast to multiple users (nodes 122a-122n) demanding the same content.

In addition, or alternatively, to comprising a content provider, the multimedia source 110 may comprise one or more MBMS base stations through which the content may be relayed to the nodes 122a-122n from a content provider.

The nodes 122a-122n generally comprise multi-homed apparatuses configured to interface with at least two different types of communication networks. One of the communication networks comprises an MBMS wide area network (WAN) 130, such as, a cellular network, a 3G network, etc., through which the nodes 122a-122n receive data packets 132 from the multimedia source 110. Another one of the communication networks comprises a wireless local area network (WLAN) 140, such as, an IEEE 802.11 based ad hoc peer-to-peer network, a Bluetooth based peer-to-peer network, etc. In any regard, the nodes 122a-122n may comprise any reasonably suitable electronic multi-homed apparatus, such as, a cellular telephone, a laptop computer, a personal digital assistant, a wireless peripheral device for a computer, a portable media player, etc.

As also shown in FIG. 1A, the WLAN 140 communication network among the nodes 122a-122n enables the nodes 122a-122n to form a peer group 120. The peer group 120 generally comprises nodes 122a-122n that are within range of at least one other node 122a to enable communication of data packets 142 over the WLAN 140 connection. In this regard, at least one of the nodes 122a-122n is capable of transmitting data packets 142 to at least one other node 122b in the peer group 120. In addition, at least one of the nodes 122a-122n is capable of receiving the data packets 142 transmitted via the WLAN 140. As discussed in greater detail herein below, the nodes 122a-122n may receive data packets 142 that were missed from the multimedia source 110 from the other nodes 122a-122n.

Figure 1B:
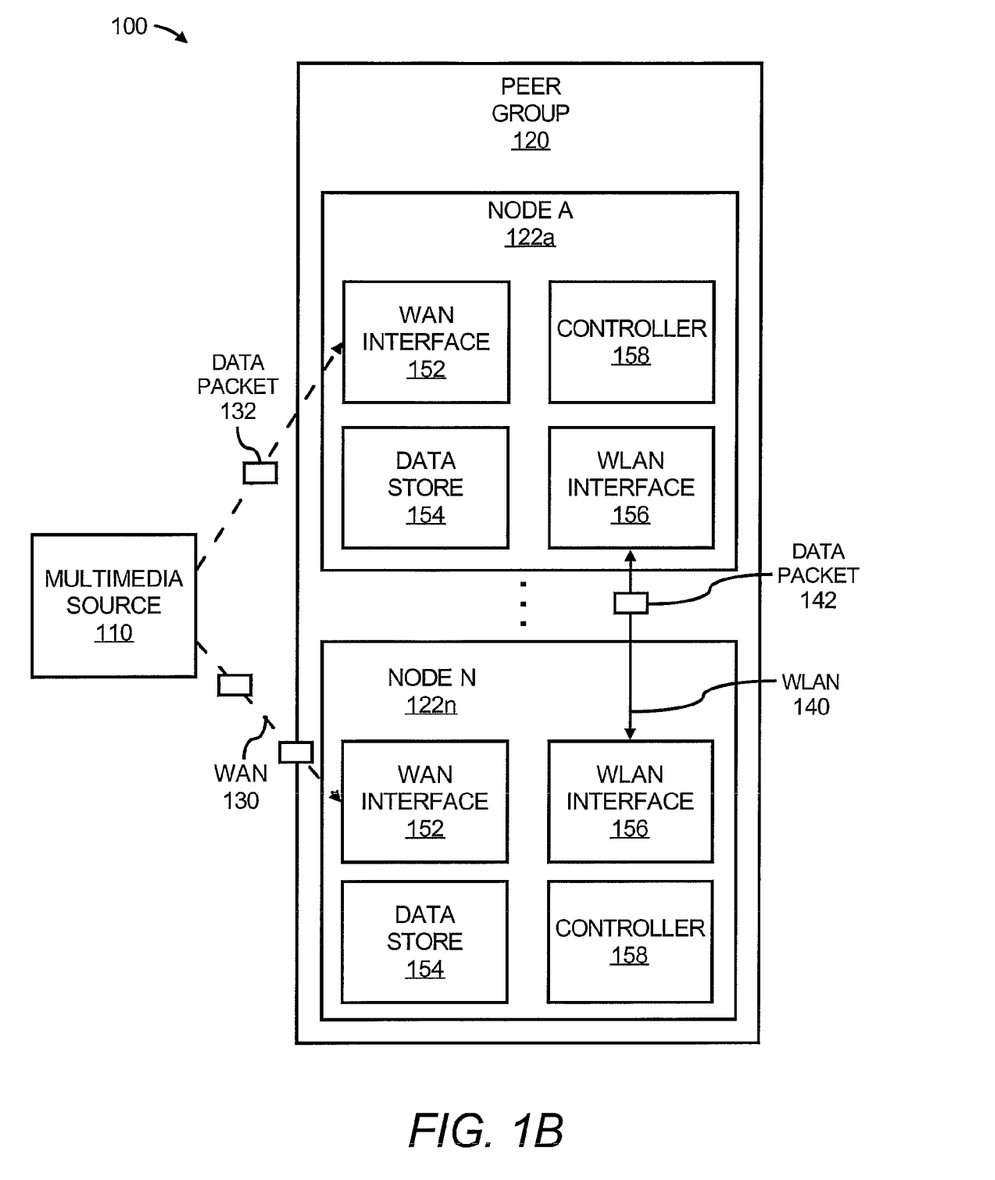
FIG. 1B depicts a simplified block diagram of the system depicted in FIG. 1A, in which the nodes are depicted in greater detail, according to an embodiment of the invention.

With reference now to FIG. 1B, there is shown a simplified block diagram of the system 100 depicted in FIG. 1A, in which the nodes 122a-122n are depicted in greater detail, according to an example. It should be understood that the nodes 122a-122n may include additional components and that some of the components described herein may be removed and/or modified without departing from a scope of the system 100.

The ellipses depicted between the nodes 122a and 122n indicate that the peer group 120 may include any number of nodes 122a-122n without departing from a scope of the system 100.

As shown in FIG. 1B, each of the nodes 122a-122n includes a WAN interface 152, a data store 154, a WLAN interface 156, and a controller 158. The WAN interface 152 generally enables communication over the WAN 130 with the multimedia source 110, including receipt of data packets 132. In this regard, the WAN interface 152 comprises hardware and/or software to enable one-way or two-way communication of data with the multimedia source 110.

The data packets 132 received through the WAN interface 152 are stored in the data store 154. The data store 154 comprises any device capable of storage of information or any combination of devices capable of storage of information, such as, a semiconductor device, a magnetic disk memory device, nonvolatile memory devices, such as, an EEPROM or CDROM, etc. The data store 154 may also comprise a fixed or removable data storage device. In addition to storing the data packets 132, the data store 154 may also store one or more program instructions, which the controller 158 may execute in performing various operations in the nodes 122a-122n.

The controller 158 provides control over various node 122a-122n functions. According to an example, the controller 158 comprises a microprocessor circuit programmed to perform one or more methods including, for instance, determining which data packets 132 have been received and which are missing, determining which data packets 142 to output, determining which nodes 122a-122n are in a peer group 120, determining time allocations for outputting data packets 142, calculating linear combinations of the data packets 132 received from the multimedia source 110, etc.

The controller 158 is also configured to control the WLAN interface 156, which comprises hardware and/or software to enable one-way or two-way communication of data with at least one other node 122a. According to an example, the controller 158 implements the WLAN interface 156 to output data packets 142 that the node 122a has received from the multimedia source 110.

The nodes 122a-122n in the peer group 120 are thus able to recover data packets 132 from one or more of the other nodes 122a-122n that they failed to receive directly from the multimedia source 110 during a fixed MBMS transmission period. In one regard, the nodes 122a-122n may receive all of the demanded content from the multimedia source 110 and the other nodes 122a-122n without having to send a retransmission request to the multimedia source 110, and thus without changing the existing WAN 130.

Examples of methods in which the system 100 may be employed to distribute data packets 132/142 from the multimedia source 110 to the nodes 122a-122n will now be described with respect to the following flow diagrams of the methods 200, 230, and 250 respectively depicted in FIGS. 2A-2C. It should be apparent to those of ordinary skill in the art that other steps may be added or existing steps may be removed, modified or rearranged without departing from the scopes of the methods 200, 230, and 250.

The descriptions of the methods 200, 230, and 250 are made with reference to the system 100 illustrated in FIGS. 1A and 1B, and thus makes reference to the elements cited therein. It should, however, be understood that the methods 200, 230, and 250 are not limited to the elements set forth in the system 100. Instead, it should be understood that the methods 200, 230, and 250 may be practiced by a system having a different configuration than that set forth in the system 100.

Some or all of the operations set forth in the methods 200, 230, and 250 may be contained as utilities, programs, or subprograms, in any desired computer accessible medium. In addition, the methods 200, 230, and 250 may be embodied by computer programs. For example, they may exist as software program(s) comprised of program instructions in source code, object code, executable code or other formats. Any of the above may be embodied on a tangible computer readable medium, which include storage.

Exemplary tangible computer readable storage devices include conventional computer system RAM, ROM, EPROM, EEPROM, and magnetic or optical disks or tapes. Concrete examples of the foregoing include distribution of the programs on a CD ROM. It is therefore to be understood that any electronic device capable of executing the above-described functions may perform those functions enumerated above.

Respective controllers 158 of the nodes 122a-122n, which may comprise processors, ASICs, microcontrollers, etc., may implement or execute one or more of the methods 200, 230, and 250 in effectively distributing the data packets 132/142 such that those nodes 122a-122n that failed to receive the data packets 132 directly from the multimedia source 110 receives the missing data packets 132 from at least one other node 122a-122n.

The steps of the methods 200, 230, and 250 are depicted as being performed by a pair of nodes 122a and 122b of a peer group 120. It should, however, be understood that various steps in the methods 200, 230, and 250 may be performed by additional ones of the nodes 122c-122n and that the two nodes 122a and 122b depicted in FIGS. 2A-2C is for purposes of simple illustration only. As such, although particular reference is made below to particular nodes 122a and 122b, the descriptions of the steps described below should be construed as applying to additional ones of the nodes 122a-122n.

Figure 2A:
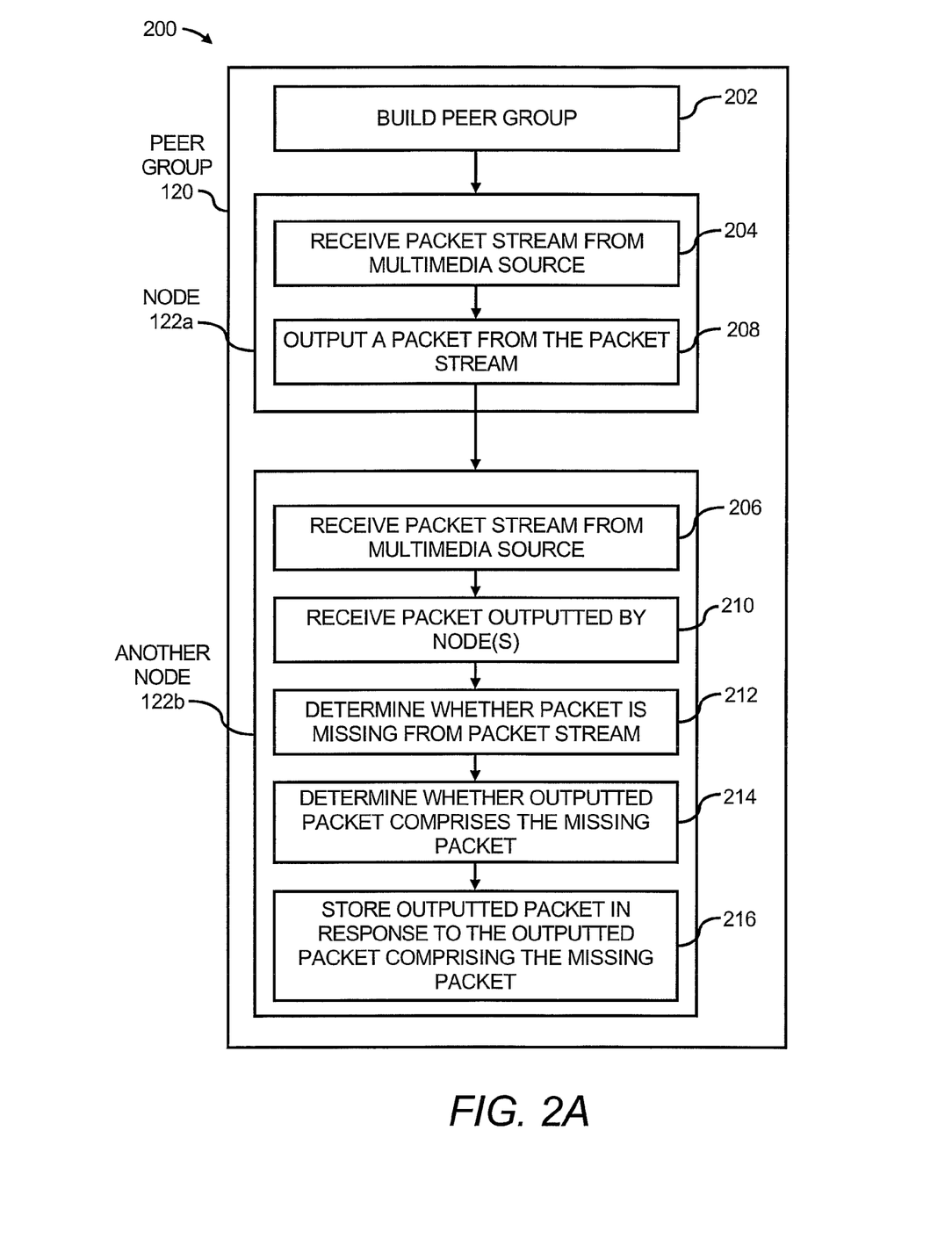
FIG. 2A shows a flow diagram of a method of distributing packets from a multimedia source to a plurality of nodes, according to an embodiment of the invention.

With reference first to FIG. 2A, there is shown a flow diagram of a method 200 of distributing packets from the multimedia source 110 to the plurality of nodes 122a-122n, according to an example. At step 202, a peer group 120 formed of nodes 122a-122n, for instance, that are within a WLAN 140 range of at least one other node 122a-122n, is built. By way of example, the peer group 120 may be formed as an ad-hoc peer group 120 through use of an "announce-and-listen" protocol. Under this protocol, a first node 122a announces its intention to build a group, such as, a cooperative peer-to-peer repair (CPR) group for a video stream, via local broadcast. The first node 122a will listen for a predetermined period of time for responses from its peer nodes 122b-122n. The nodes 122b-122n within listening distance and that receive the video stream, such as, a second node 122b, will respond by local broadcast. The second node 122b may also forward the original announcement from the first node 122a such that it may be communicated to nodes outside of the first node's 122a range. The first node 122a determines that the nodes 122b-122n that responded to the announcement are within range and are willing to particulate in the CPR group. The node 122a may make this determination through implementation of standard protocols, such as, IEEE 802.11, Bluetooth, etc.

At steps 204 and 206, a first node 122a and a second (or another) node 122b receive a packet stream from a multimedia source 110. More particularly, at steps 204 and 206, the first node 122a and the second node 122b receive a multicast or a broadcast from the multimedia source 110, containing the packet stream. Receipt of the packet stream by the first node 122a and the second node 122b has been depicted as comprising different steps because there may exist a difference in time between when the first node 122a and the second node 122b receive the packet stream. This difference in data packet receipt may occur because each of the nodes 122a and 122b experiences its own unique time-varying channel in its connection to the multimedia source 110 through the WAN 130.

In addition, the first node 122a and the second node 122b may not receive all of the data packets contained in the packet stream due to, for instance, wireless link failures resulting from shadowing, fading, and/or interferences. As such, the first node 122a may receive a different subset of data packets 132 as compared with the subset of data packets 132 that the second node 122b receives. Moreover, the nodes 122a and 122b may each receive less than all of the data packets 132 contained in the packet stream and may also fail to obtain different ones of the data packets 132.

The probability that at least some users in a large group receives a given data packet 132 is relatively high because MBMS media distribution is typically optimized for the average user experiencing average channel conditions. As such, there is a relatively high likelihood that those nodes 122a-122n that failed to receive the given data packet 132 will be able to receive the given data packet 132 from one of the other nodes 122a-122n that received the given data packet 132 from the multimedia source 110.

At step 208, the first node 122a outputs at least one data packet 142 received from the packet stream. The first node 122a may output the at least one data packet 142 through implementation of the WLAN interface 156. According to an example, the first node 122a establishes a network connection over the WLAN 140 with one or more of the other nodes 122b-122n prior to outputting the at least one data packet 142, for instance, at step 202. In this example, the first node 122a may directly communicate the data packet 142 to the one or more other nodes 122b-122n to which the first node 122a established a connection. According to another example, the first node 122a locally broadcasts the at least one data packet 142 without knowledge of which of the other nodes 122b-122n are capable of receiving the outputted at least one data packet 142.

At step 210, the second (or another) node 122b receives the packet outputted by the first node 122a through the WLAN interface 156. At step 212, the another node 122b determines whether it is missing any of the data packets sent by the multimedia source 110. In addition, at step 214, the another node 122b determines whether the at least one data packet 142 received from the first node 122a comprises any of the missing data packets. In response to the at least one data packet outputted by the first node 122a comprising a missing data packet in the another node 122b, the outputted at least one missing data packet 142 is stored in the data store 154, as indicated at step 216. Otherwise, if the at least one data packet 142 comprises a data packet 132 that the another node 122b received at step 206, the another node 122b may discard that at least one data packet 142.

The another node 122b may also output at least one of the data packets it received from the multimedia source 110 in any of the manners discussed with respect to the first node 122a above at step 208. In addition, steps 202-216 may be performed by each of the nodes 122a-122n in the peer group 120 and may be repeated for a predetermined number of iterations, until a determination that all of the nodes 122a-122n have received all of the data packets, for a predetermined period of time, etc. As such, each of the nodes 122a-122n may both output data packets 142 and receive data packets 142.

Figure 2B:
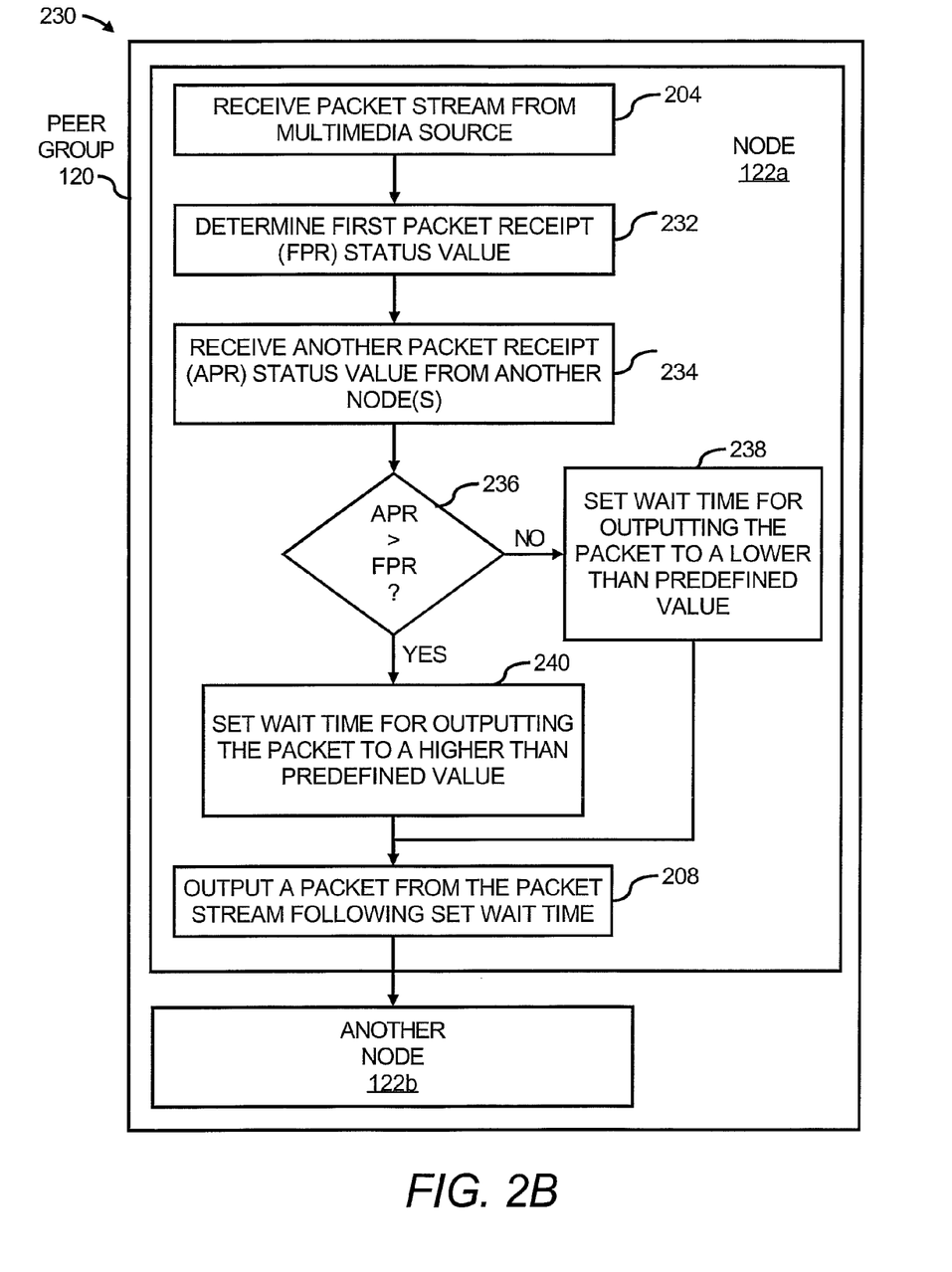
FIG. 2B shows a flow diagram of a method of varying the start of transmission times for distributing packets among nodes within a peer group, according to an embodiment of the invention.

Turning now to FIG. 2B, there is shown a flow diagram of a method 230 of varying the start of transmission times for distributing packets among nodes 122a-122n within a peer group 120, according to an example. The method 230 includes some of the same steps discussed above with respect to FIG. 2A. Descriptions of the same steps are omitted from the description of the method 230 and the descriptions provided above with respect to the method 200 are relied upon for these steps.

Generally speaking, the method 230 may be employed to vary the start of transmission times by the nodes 122a-122n based upon the relative number of packets each of the nodes 122a-122n has received from the multimedia source 110. In one regard, by varying the starting times for transmitting the packets 142, the nodes 122a-122n with the larger number of packets 132/142 will likely transmit more packets 132/142 than the nodes 122a-122n with fewer packets 132/142. As such, the nodes 122a-122n requiring the highest number of packets 132/142 are more likely to receive missing packets 132/142. In addition, staggering the times that the nodes 122a-122n transmit their packets 142 also decreases the likelihood of in-air packet collision.

At step 232, the first node 122a determines a first packet receipt status value. More particularly, the first node 122a determines a value associated with the data packets 132 it has received from the multimedia source 110. The first packet receipt status value may, for instance, be based upon the total number of packets received from the multimedia source 110.

Although not shown, the other nodes 122b-122n may also determine their respective packet receipt status values. In addition, the nodes 122a-122n may output their respective packet receipt status values to the other nodes 122a-122n. In this regard, at step 234, the first node 122a may receive another packet receipt status value from at least one other node 122b-122n.

At step 236, the controller 158 determines whether the another packet receipt status value exceeds the first packet receipt status value. In other words, the controller 158 determines whether the another node 122b from which the another packet receipt status was received, received a greater number of packets as compared with the first node 122a. In the event that the first node 122a received more packets and thus has a higher packet receipt status value, which corresponds to a "no" condition at step 236, the controller 158 sets the wait time before packet transmission for outputting the received packet at step 208 to a lower than predefined value, as indicated at step 238.

In the event that the another packet receipt status value exceeds the first packet receipt status value, which corresponds to a "yes" condition at step 236, the controller 158 sets the wait time before packet transmission for outputting the received packet at step 208 to a higher than predefined value, as indicated at step 240. The predefined value may correspond to a nominal time, an arbitrarily set time, an average time required, etc., for outputting received packets.

In any regard, at step 208, the controller 158 may output the received packet following the set wait time before transmission at either steps 238 or 240. In addition, the another node 122b may receive the outputted packet and may perform steps 210-216 as described above with respect to FIG. 2A.

Figure 2C:
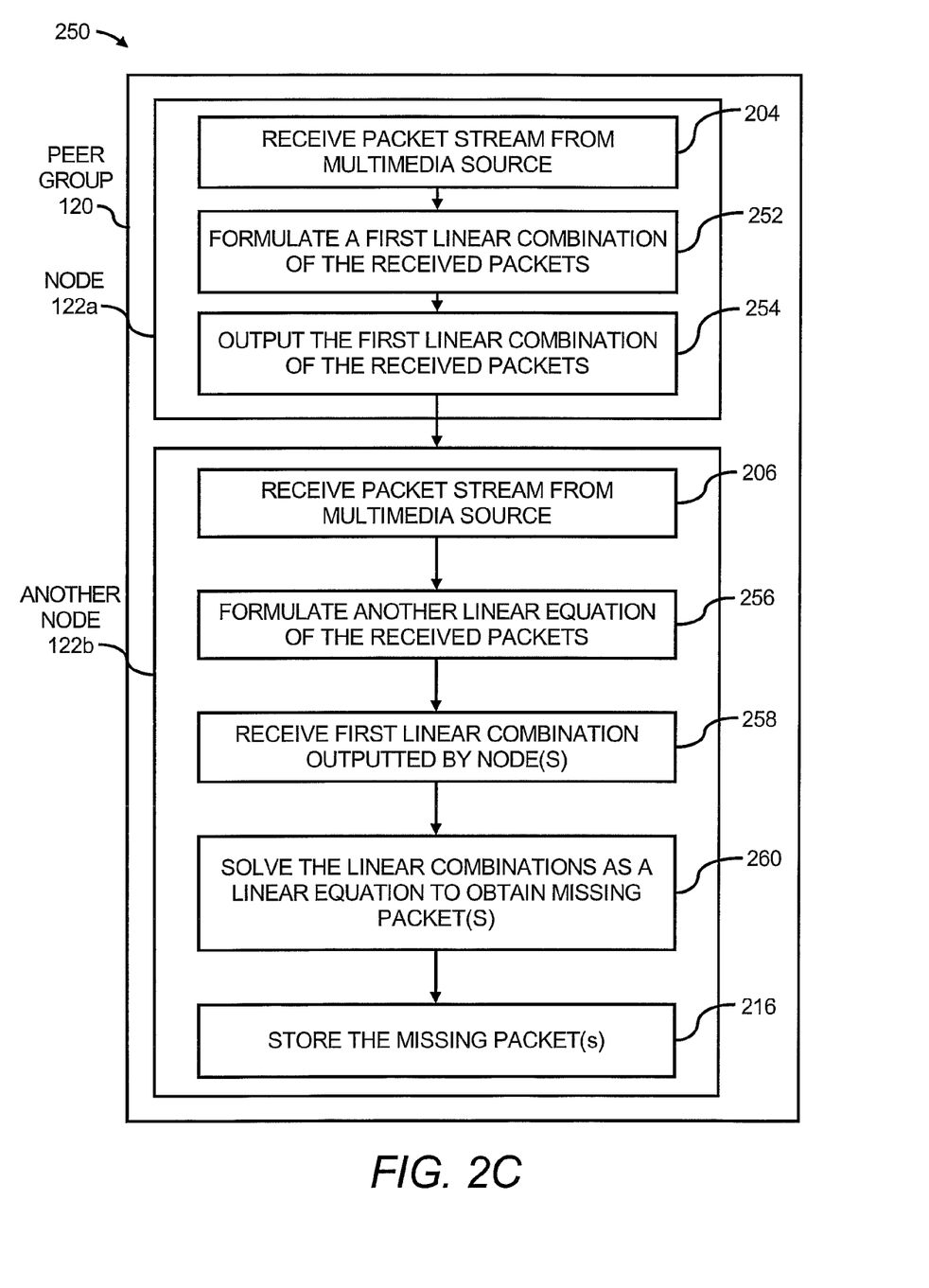
FIG. 2C shows a flow diagram of a method of communicating network coded versions of the data packets among the nodes within a peer group, according to an embodiment of the invention.

Turning now to FIG. 2C, there is shown a flow diagram of a method 250 of communicating network coded versions of the data packets among the nodes 122a-122n within a peer group 120, according to an example. The method 250 includes some of the same steps discussed above with respect to FIG. 2A. Descriptions of the same steps are omitted from the description of the method 250 and the descriptions provided above with respect to the method 200 are relied upon for these steps.

At step 252, the controller 158 formulates a linear combination of the packets received at step 204. By way of example, the multimedia source 110 may have transmitted six (6) data packets 132 during a fixed MBMS transmission period or epoch. In this example, the first node 122a may have received packets (p) {1, 3, 5} of the N=6 total packets contained in the packet stream. As such, the controller 158 may formulate a linear combination of the received packets 142 according to the following equation:

$$q = c_1 p_1 + c_3 p_3 + c_5 p_5.$$ Equation (2):

In Equation (2), q represents network coded packets, and $c_i$ represents random integers for a given transmission.

At step 254, the first node 122a outputs the formulated first linear combination.

At step 256, the controller 158 of the another node 122b formulates another linear combination of packets it received from the multimedia source 110. In keeping with the example above, the multimedia source 110 may have transmitted six (6) data packets 132 during a fixed MBMS transmission period or epoch. In this example, the another node 122b may have received packets (p) {2, 4, 6} of the N=6 total packets contained in the packet stream. As such, the controller 158 may formulate a linear combination of the received packets 142 according to the following equation:

$$q = c_2 p_2 + c_4 p_4 + c_6 p_6.$$ Equation (3):

At step 258, the another node 122b receives the first linear combination outputted by the first node 122a. In addition, at step 260, the controller 158 of the another node 122b solves the first linear combination and the another linear combination as a linear equation to obtain packets that were not received directly from the media source 110. Generally speaking, the a node 122a that has M missing packets will require N (independent) linear combinations to recover the N original packets 132 communicated from the media source 110. The nodes 122a-122n may thus receive linear combinations from multiple ones of the other nodes 122a-122n to have a sufficient number of linear combinations to recover the M missing packets.

At step 216, the controller 158 stores the one or more missing packets derived from solving the linear combinations as a linear equation.

According to an example, a node 122a that fails to receive all of the data packets 132 from the multimedia source 110, may be able to recover the missing content from the other nodes 122b-122n by solving a set of N linear equations, for instance, there may be 6 equations with 6 unknowns when there are 6 data packets contained in the packet stream transmitted by the multimedia source during a fixed MBMS transmission period. Thus, for example, in keeping with the example above, if a third node 122c has received data packets (p) {1, 2, 4} of the N=6 total data packets, the third node 122c will require three (3) combinations from the other nodes 122a, 122b, 122d-122n to recover the missing packets {3, 5, 6}. In the example above, the first node 122a received packets {1, 3, 5} and the second node 122b received packets {2, 4, 6}, the third node 122c may recover the missing packets {3, 5, 6} if it receives he following network coded packet: $q_1 = c_1 p_1 + c_3 p_3 + c_5 p_5$ from the first node 122a, and the following network-coded packet: $q_2 = c_2 p_2 + c_4 p_4 + c_6 p_6$ from the second node 122b, and the following network-coded packet: $q_3 = d_1 p_1 + d_3 p_3 + d_5 p_5$. In the previous equations, $d_i$ represents random integers for a given transmission and $d_i$ differs from $c_i$.

It should be noted that if the third node 122c received the following combinations: $q_1 = c_1 p_1 + c_3 p_3 + C_5 p_5$ from the first node 122a, and the following network-coded packet: $q_2 = c_2 p_2 + c_4 p_4 + c_6 p_6$ from the second node 122b, and the following network-coded packet: $q_4 = d_2 p_2 + d_4 p_4 + d_6 p_6$ from the second node 122b, the third node 122c will be unable to recover the missing packets {3, 5, 6} because the network-coded packet q4 is not linearly independent from the received set {$p_1, p_2, p_4, q_2$}. However, if the second node 122b used the combination $q_1 = c_1 p_1 + c_3 p_3 + c_5 p_5$ received from the first node 122a to generate a second combination: $q_4' = e_1 p_1 + \ldots + e_6 p_6$, then the third node 122c may use $q_4'$ together with the received set {$p_1, p_2, p_4, q_1, q_2$} to recover the missing packets {3, 5, 6}.

In other words, the controllers 158 in each of the nodes 122a-122n may formulate additional linear combinations derived from both the first linear combination and the another linear combination, such as, $q_4'$, to enable recovery of missing packets. By way of example, the another node 122b may formulate an additional linear combination by combining the first linear combination with the another linear combination. In addition, the controllers 158 may output the additional linear combinations. Moreover, the controllers 158 may formulate further linear combinations from the additional linear combinations they receive. In one regard, the nodes 122a-122n that are missing data packets may more readily receive the missing data packets from a lesser number of nodes 122a-122n.

Figure 3:
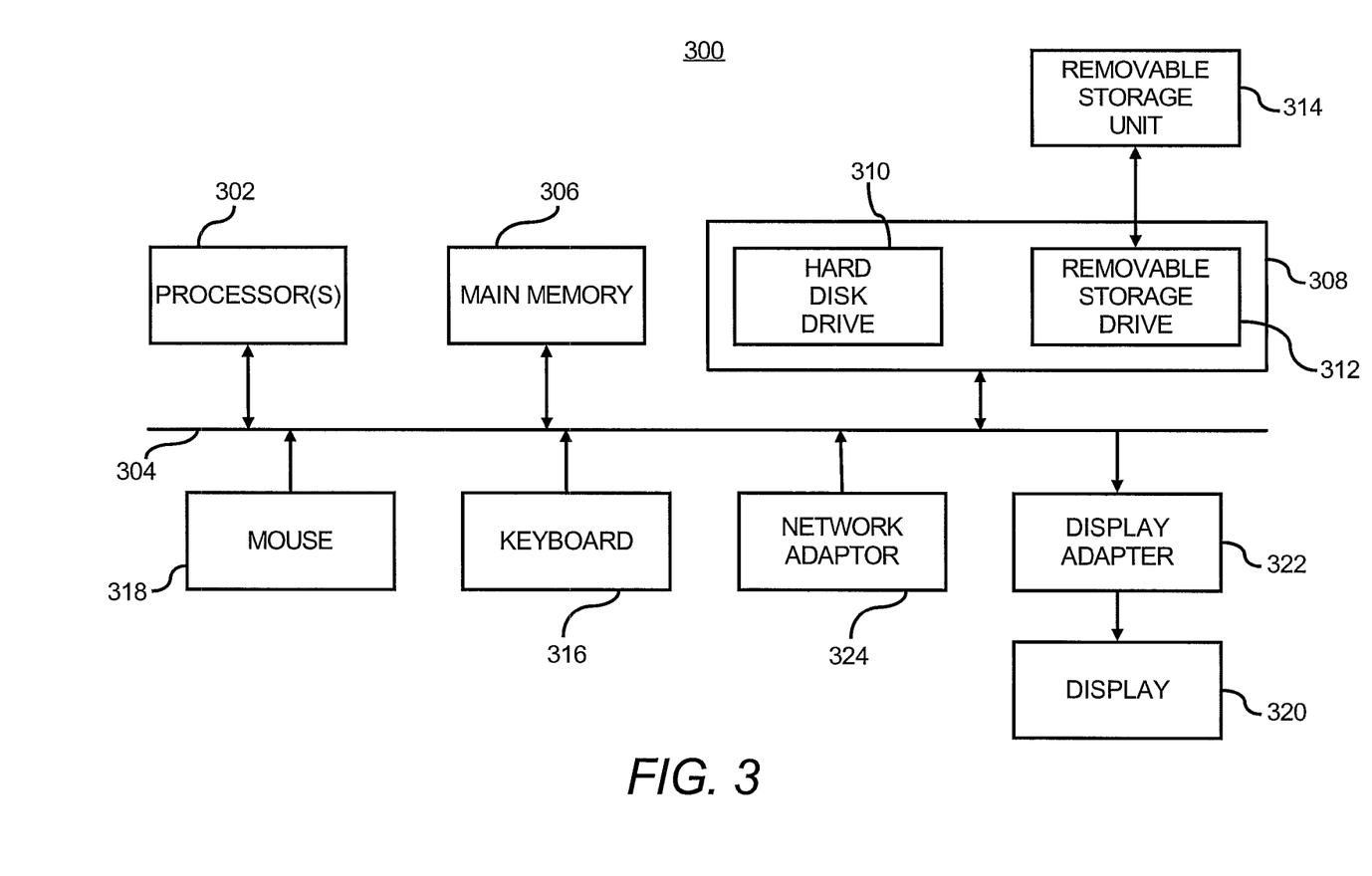
FIG. 3 shows a block diagram of a computing apparatus configured to implement or execute the methods depicted in FIGS. 2A-2C, according to an embodiment of the invention.

FIG. 3 illustrates a block diagram of a computing apparatus 300 configured to implement or execute the methods 200, 230, and 250 depicted in FIGS. 2A-2C, according to an example. In this respect, the computing apparatus 300 may be used as a platform for executing one or more of the functions described hereinabove with respect to the nodes 122a-122n depicted in FIGS. 1A and 1B.

The computing apparatus 300 includes a processor 302 that may implement or execute some or all of the steps described in the methods 200, 230, and 250. Commands and data from the processor 302 are communicated over a communication bus 304. The computing apparatus 300 also includes a main memory 306, such as a random access memory (RAM), where the program code for the processor 302, may be executed during runtime, and a secondary memory 308. The secondary memory 308 includes, for example, one or more hard disk drives 310 and/or a removable storage drive 312, representing a floppy diskette drive, a magnetic tape drive, a compact disk drive, etc., where a copy of the program code for the methods 200, 230, and 250 may be stored.

The removable storage drive 312 reads from and/or writes to a removable storage unit 314 in a well-known manner. User input and output devices may include a keyboard 316, a mouse 318, and a display 320. A display adaptor 322 may interface with the communication bus 304 and the display 320 and may receive display data from the processor 302 and convert the display data into display commands for the display 320. In addition, the processor(s) 302 may communicate over a network, for instance, the Internet, LAN, etc., through a network adaptor 324.

It will be apparent to one of ordinary skill in the art that other known electronic components may be added or substituted in the computing apparatus 300. It should also be apparent that one or more of the components depicted in FIG. 3 may be optional (for instance, user input devices, secondary memory, etc.).

What has been described and illustrated herein is a preferred embodiment of the invention along with some of its variations. The terms, descriptions and figures used herein are set forth by way of illustration only and are not meant as limitations. Those skilled in the art will recognize that many variations are possible within the scope of the invention, which is intended to be defined by the following claims—and their equivalents—in which all terms are meant in their broadest reasonable sense unless otherwise indicated.

What is claimed is:

1. A method of distributing packets from a multimedia source to a plurality of nodes, said method comprising:
    (a) in at least one of the plurality of nodes,
        (i) receiving a packet stream containing one or more packets from the multimedia source;
        (ii) outputting a received packet;
        (iii) formulating a first linear combination of the one or more packets received in the packet stream;
        (iv) outputting the formulated first linear combination;
    (b) in at least another one of the plurality of nodes,
        (i) receiving the packet stream from the multimedia source;
        (ii) receiving the packet and the first linear combination outputted by the at least one of the plurality of nodes;
        (iii) formulating another linear combination of the one or more packets received from the packet stream;
        (iv) solving N linear equations for M missing packets, wherein the linear equations are comprised of M linear combinations received from other nodes and (N-M) original packets received from the multimedia source, where N and M are positive integers;
        (v) determining whether the packet outputted by the at least one other node comprises a missing packet of the M missing packets; and
        (vi) storing the packet outputted by the at least one other node in response to the outputted packet comprising the missing packet.

2. The method according to claim 1, further comprising:
    (c) building a peer group among the plurality of nodes that receive the packet stream from the multimedia source.

3. The method according to claim 2, further comprising:
    (d) in each of the plurality of nodes in the peer group, determining whether a packet is missing from the packet stream; and
    (e) repeating steps (a), (b), and (d) until all of the nodes in the peer group contains all of the packets from the packet stream.

4. The method according to claim 1, further comprising:
    (b) in the at least another one of the plurality of nodes,
        (vii) formulating second linear combination derived from the first linear combination and the another linear combination; and
        (viii) outputting the second formulated linear combination.

5. The method according to claim 1, wherein steps (a)(i) and b(i) further comprise receiving the packet stream from the multimedia source over a wide area network, wherein the multimedia source is configured to at least one of broadcast and multicast the packet stream to the plurality of nodes, and wherein steps (a)(ii) and (b)(ii) further comprise respectively outputting and receiving the packet over a peer-to-peer network among the plurality of nodes.

6. A method of distributing packets from a multimedia source to a plurality of nodes, said method comprising:
    (a) in the at least one of the plurality of nodes,
        (i) receiving a packet stream containing one or more packets from the multimedia source;
        (ii) outputting a received packet;
        (iii) determining a first packet receipt status value;
        (iv) receiving another packet receipt status value from at least another one of the plurality of nodes;
        (v) determining whether the another packet receipt status value exceeds the first packet receipt status value;
        (vi) in response to the another packet receipt status value exceeding the first packet receipt status value, setting a wait time before outputting the received packet to a higher than a predefined value; and
        (vii) in response to the another packet receipt status value falling below the first packet receipt status value, setting the wait time before outputting the received packet to a lower than a predefined value; and
    (b) in at least the another one of the plurality of nodes,
        (i) receiving the packet stream from the multimedia source;
        (ii) receiving the packet outputted by the at least one of the plurality of nodes;
        (iii) determining whether a packet is missing from the packet stream received from the multimedia source;

(iv) determining whether the packet outputted by the at least one other node comprises a missing packet; and (v) storing the packet outputted by the at least one other node in response to the outputted packet comprising the missing packet.

7. The method according to claim 6, further comprising:

(c) building a peer group among the plurality of nodes that receive the packet stream from the multimedia source.

8. The method according to claim 7, further comprising:

(d) in each of the plurality of nodes in the peer group, determining whether a packet is missing from the packet stream; and (e) repeating steps (a), (b), and (d) until all of the nodes in the peer group contains all of the packets from the packet stream.

9. The method according to claim 6, wherein steps (a)(i) and b(i) further comprise receiving the packet stream from the multimedia source over a wide area network, wherein the multimedia source is configured to at least one of broadcast and multicast the packet stream to the plurality of nodes, and wherein steps (a)(ii) and (b)(ii) further comprise respectively outputting and receiving the packet over a peer-to-peer network among the plurality of nodes.

10. A system for distributing packets, said system comprising:

a plurality of nodes, each of said plurality of nodes comprising a first interface and a second interface, wherein the first interface enables receipt of packets from a multimedia source and wherein the second interface enables communication of packets among the plurality of nodes;

each of said plurality of nodes further comprising respective controllers, in at least one of the plurality of nodes, said controller being configured to cause a packet received by the at least one node to be locally outputted, wherein at least another one of the plurality of nodes is configured to receive the packet from the at least one of the plurality of nodes and to store the packet in response to the packet comprising a missing packet of the packets transmitted by the multimedia source; and wherein the controller of the at least one of the plurality of nodes is configured to formulate a first linear combination of the one or more packets received from the multimedia source and to output the formulated first linear combination, wherein the controller of the at least another one of the plurality of nodes is configured to formulate another linear combination of the one or more packets received from the multimedia source, to receive the first linear combination, and to solve N linear equations for M missing packets, wherein the linear equations comprising of M linear combinations received from other nodes and (N-M) original packets received from the multimedia source, where N and M are positive integers.

11. The system according to claim 10, wherein the controllers of the plurality of nodes are configured to build a peer group among the plurality of nodes that receive the packet stream from the multimedia source.

12. The system according to claim 11, wherein the controllers of each of the plurality of nodes in the peer group are configured to determine whether a packet is missing from the packet stream; and to obtain missing packets from at least one other node.

13. The system according to claim 10, wherein the controller of at least one of the at least another one of the plurality of nodes is further configured to formulate another linear combination derived from the first linear combination and the another linear combination and to output the another formulated linear combination.

14. A non-transitory computer readable storage medium on which is embedded one or more computer programs, said one or more computer programs implementing a method of distributing packets from a multimedia source to a plurality of nodes, said one or more computer programs comprising computer readable code for:

(a) in at least one of the plurality of nodes,
(i) receiving a packet stream from the multimedia source;
(ii) outputting a received packet;
(iii) formulating a first linear combination of the one or more packets received in the packet stream;
(iv) outputting the formulated first linear combination;

(b) in at least another one of the plurality of nodes,
(i) receiving the packet stream from the multimedia source;
(ii) receiving the packet and the first linear combination outputted by the at least one of the plurality of nodes;
(iii) formulating another linear combination of the one or more packets received from the packet stream;
(iv) solving N linear equations for M missing packets, wherein the linear equations are comprised of M linear combinations received from other nodes and (N-M) original packets received from the multimedia source, where N and M are positive integers;
(v) determining whether the packet outputted by the at least one other node comprises a missing packet of the M missing packets; and
(vi) storing the packet outputted by the at least one other node in response to the outputted packet comprising the missing packet.

15. The non-transitory computer readable storage medium according to claim 14, said one or more computer programs further comprising computer readable code for:

(c) building a peer group among the plurality of nodes that receive the packet stream from the multimedia source.

16. The non-transitory computer readable storage medium according to claim 15, said one or more computer programs further comprising computer readable code for:

(d) in each of the plurality of nodes in the peer group, determining whether a packet is missing from the packet stream; and (e) repeating steps (a), (b), and (d) until all of the nodes in the peer group contains all of the packets from the packet stream.

* * * * *

UNITED STATES PATENT AND TRADEMARK OFFICE
CERTIFICATE OF CORRECTION

| | |
|---|---|
| PATENT NO. | : 7,801,069 B2 |
| APPLICATION NO. | : 12/166998 |
| DATED | : September 21, 2010 |
| INVENTOR(S) | : Gene Cheung |

It is certified that error appears in the above-identified patent and that said Letters Patent is hereby corrected as shown below:

In column 10, line 34, in Claim 5, delete "b(i)" and insert -- (b)(i) --, therefor.

In column 11, line 17, in Claim 9, delete "b(i)" and insert -- (b)(i) --, therefor.

Signed and Sealed this
Twentieth Day of December, 2011

David J. Kappos
*Director of the United States Patent and Trademark Office*